(12) United States Patent
Zhang et al.

(10) Patent No.: US 8,098,885 B2
(45) Date of Patent: Jan. 17, 2012

(54) ROBUST ONLINE FACE TRACKING

(75) Inventors: Weiwei Zhang, Beijing (CN); Rong Xiao, Beijing (CN); Xiaoou Tang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 701 days.

(21) Appl. No.: 11/265,773

(22) Filed: Nov. 2, 2005

(65) Prior Publication Data

US 2007/0098218 A1 May 3, 2007

(51) Int. Cl.
*G06K 9/00* (2006.01)
(52) U.S. Cl. ........ 382/103; 382/107; 382/190; 382/209; 382/218; 382/275; 348/169; 348/170; 348/171; 348/172
(58) Field of Classification Search .................. 382/103, 382/190, 209, 218, 107, 118; 348/169–172
See application file for complete search history.

(56) References Cited

U.S. PATENT DOCUMENTS

| | | | | |
|---|---|---|---|---|
| 6,075,557 A | * | 6/2000 | Holliman et al. | 348/51 |
| 6,650,704 B1 | * | 11/2003 | Carlson et al. | 375/240.01 |
| 7,200,247 B2 | * | 4/2007 | Ohba | 382/103 |
| 2003/0081813 A1 | * | 5/2003 | Astle | 382/103 |
| 2005/0094849 A1 | * | 5/2005 | Sung et al. | 382/103 |

FOREIGN PATENT DOCUMENTS

| | | |
|---|---|---|
| JP | 10111946 A | 4/1998 |
| JP | 2001034756 A | 2/2001 |
| JP | 2002032743 A | 1/2002 |

OTHER PUBLICATIONS

Maggio, E.; Cavallaro, A.; Hybrid Particle Filter and Mean Shift tracker with adaptive transition model. Acoustics, Speech, and Signal Processing, 2005. Proceedings. (ICASSP '05). IEEE International Conference on vol. 2, Mar. 18-23, 2005 pp. 221-224.*
Caifeng Shan; Yucheng Wei; Tieniu Tan; Ojardias, F.; Real time hand tracking by combining particle filtering and mean shift Automatic Face and Gesture Recognition, 2004. Proceedings. Sixth IEEE International Conference on May 17-19, 2004, pp. 669-674.*
Deguchi, K.; Kawanaka, O.; Okatani, T.; Object tracking by the mean-shift of regional color distribution combined with the particle-filter algorithms. Pattern Recognition, 2004. ICPR 2004. Proceedings of the 17th International Conference on Aug. 23-26, 2004, vol. 3, pp. 506-509.*
PCT Search Report & Written Opinion for Application No. PCT/US2006/042617 mailed on Mar. 28, 2007.
Li, Shengping, "A Face Detection and Tracking Algorithm Combining Facial Character with Active Contour", Mini-Micro Systems, Issue 10, vol. 24, p. 1839-1840. English Abstract.
Rander, Peter W., "Real-Time Image-Based Fast Tracking", http://www.ece.cmu.edu/research/publications/1993, p. 13-24, May 6, 1993.
Chinese Office Action dated Mar. 1, 2010 for CN App. No. 200680040318.6 (based on U.S. Appl. No. 11/265,773), filed Oct. 31, 2006, Titled "Robust Online Face Tracking", naming Microsoft Corporation as Applicant, 24 pages. CN OA cites the two references above.
Chinese Office Action mailed Mar. 23, 2011 for Chinese Patent Application No. 200680040318.6, a counterpart foreign application of U.S. Appl. No. 11/265,773.

* cited by examiner

*Primary Examiner* — Vikkram Bali
*Assistant Examiner* — Julian Brooks
(74) *Attorney, Agent, or Firm* — Lee & Hayes, PLLC

(57) ABSTRACT

Systems and methods are described for robust online face tracking. In one implementation, a system derives multiple resolutions of each video frame of a video sequence portraying movement of a visual object. The system tracks movement of the visual object in a low resolution as input for tracking the visual object in a higher resolution. The system can greatly reduce jitter while maintaining an ability to reliably track fast-moving visual objects.

17 Claims, 4 Drawing Sheets

ROBUST ONLINE FACE TRACKING

BACKGROUND

Tracking visual objects, such as representations of human faces, for online video applications and for the emerging field of computer vision remains challenging. Despite much research, many challenges remain for developing practical systems, such how to deal with changes in onscreen facial appearance, how to maintain tracking during sudden motion, and how to minimize jitter.

Conventionally, some face tracking techniques use particle based filter tracking, which can significantly improve performance. However, in real applications, this type of face tracking eventually fails due to complex background noise, appearance change, and fast motion. A more robust face tracking technique than can be provided by particle filter tracking alone is essential for practical systems, such as console games, instant messaging applications, movie editing, digital media production, etc.

In order to be practical, a face tracking system, e.g., for online video, should be fast, with a high detection rate; and efficient, with a low tracking failure rate. Such a face tracking system should track in real time yet not occupy a major share of computer processing resources, or be subject to significant jitter. Other processing tasks should be able to execute while face tracking is occurring.

SUMMARY

Systems and methods are described for robust online face tracking. In one implementation, a system derives multiple resolutions of each video frame of a video sequence portraying movement of a visual object. The system tracks movement of the visual object in a low resolution as input for tracking the visual object in a higher resolution. The system can greatly reduce jitter while maintaining an ability to reliably track fast-moving visual objects.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Overview

Systems and methods described herein provide robust tracking of human faces and other visual objects, e.g., for online video applications. Exemplary face tracking systems possess an ability to reliably perform fast-motion tracking—i.e., tracking of sudden quick position changes of a visual object—while at the same time reducing jitter. This is accomplished by tracking a visual object at different resolutions: "multi-scale tracking." Exemplary systems are also robust to changes in the appearance of a visual object—such as a face—due to changes in lighting, expression, bodily position, etc. In one implementation, the exemplary system utilizes both a global face detector and a local face detector. Accordingly, exemplary systems typically include both face detection components and multi-scale tracking components.

Exemplary System

Figure 1:
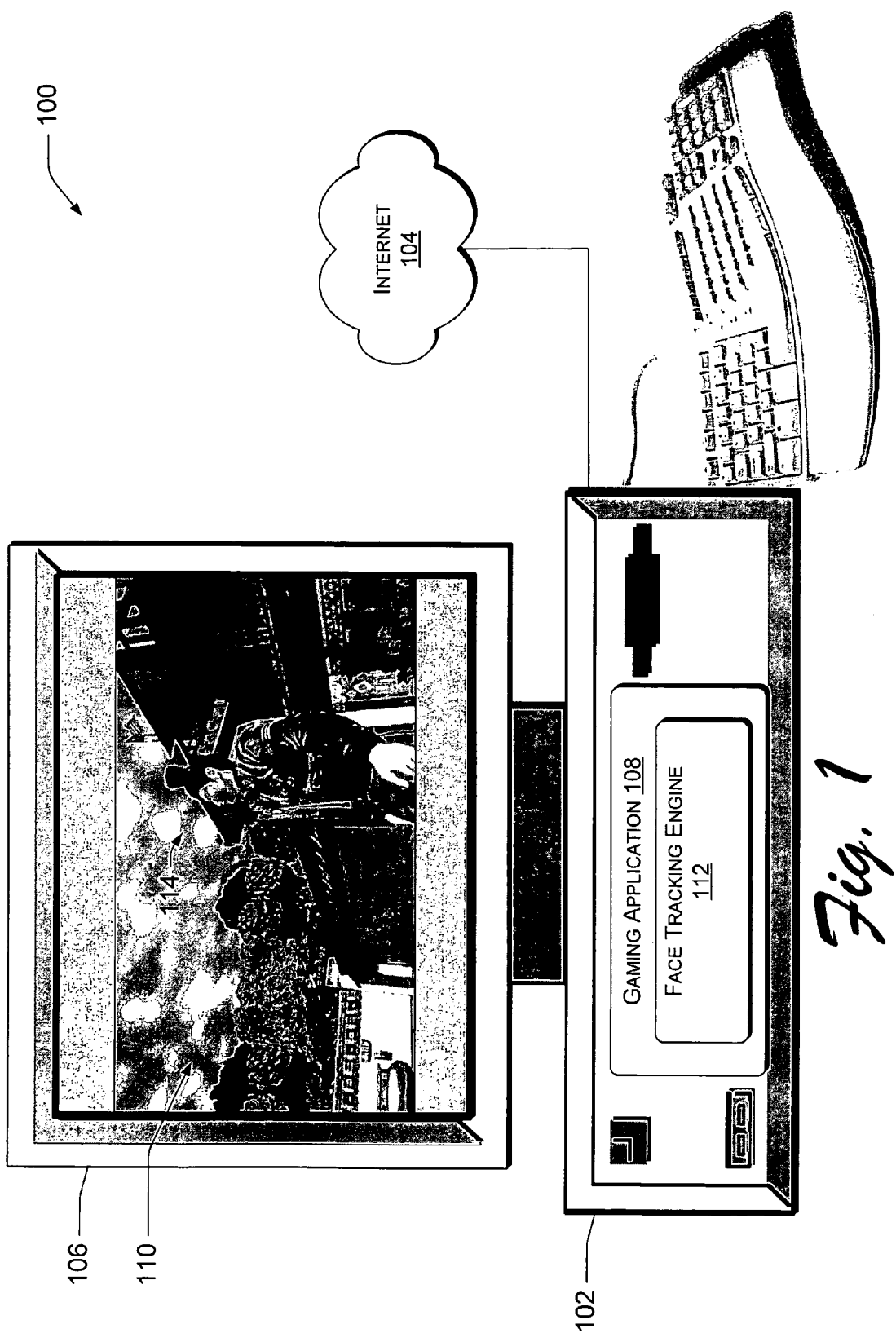
FIG. 1 is a block diagram of an exemplary face tracking system.

FIG. 1 shows an exemplary visual object tracking system, in this case, a face tracking system 100. The exemplary face tracking system 100 is a computing environment in which the face tracking described herein is performed. The exemplary face tracking system 100 includes a computing device 102, such as a desktop computer, typically connected to the Internet 104. The computing device 102 displays graphic output on a display monitor 106 and executes applications, such as the illustrated gaming application 108 that produces realistic graphic scenes with lifelike motion. An exemplary face tracking engine 112 automatically finds each face 114 in sequences of video frames, such as video frames from an online application, and tracks the position of each face 114. This face tracking is important in many online circumstances, for example, when another remote player or remote process connected to the Internet 104 controls the local movement of a visual object, such as the face of an animated character. The exemplary face tracking engine 112 is robust—that is, does not easily lose track of the position of a face even during fast movements and appearance changes, and dependably eliminates jitter while remaining computationally efficient.

Exemplary Engine

Figure 2:
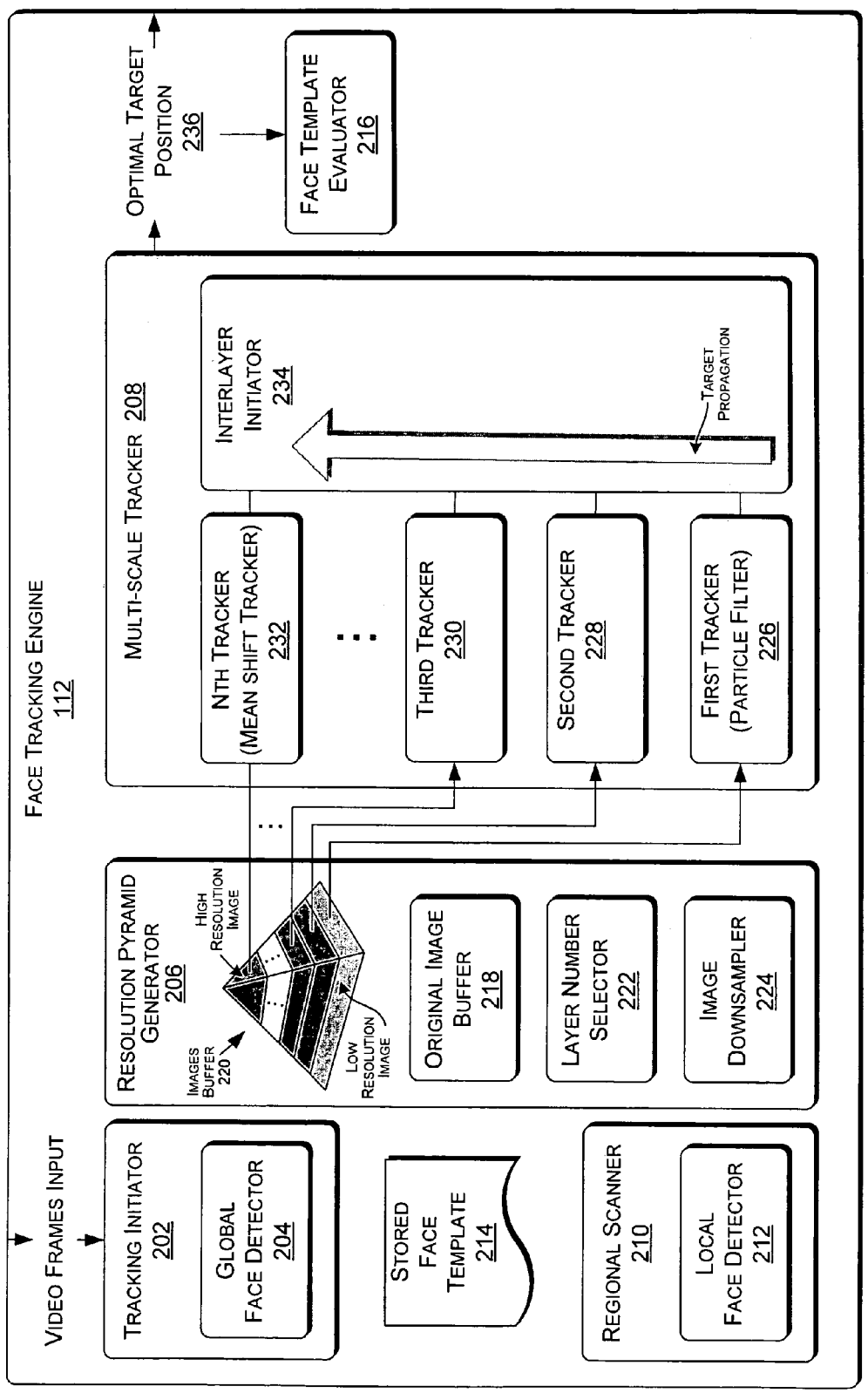
FIG. 2 is a block diagram of an exemplary face tracking engine.

FIG. 2 shows the exemplary face tracking engine 112 of FIG. 1 in greater detail. Although the exemplary engine 112 is referred to herein as a "face tracking engine," tracking a face is provided as just one example of more general "visual object tracking" which the exemplary engine 112 can perform.

The illustrated configuration of the exemplary face tracking engine 112 is meant to provide only one example arrangement for the sake of overview. Many other arrangements of the illustrated components, or similar components, are possible within the scope of the subject matter. Such an exemplary face tracking engine 112 can be executed in hardware, software, or combinations of hardware, software, firmware, etc.

The exemplary face tracking engine 112 includes a tracking initiator 202, including a global face detector 204; a resolution pyramid generator 206; a multi-scale tracker 208; a regional scanner 210, including a local face detector 212; a stored face template 214; and a face template evaluator 216.

The resolution pyramid generator 206 may further include an original image buffer 218, an images buffer 220, a layer number selector 222, and an image downsampler 224. The original image buffer 218 and the images buffer 220, like all other buffers, are implemented as a tangible and physical embodiment. As such, both the original image buffer and the images buffer are fundamental hardware components.

The exemplary multi-scale tracker 208 captures fast motion of the face 114 while controlling jitter. Conventionally, a particle filter is used to handle nonlinear and non-Gaussian tracking problems, and has the ability to capture fast motion. However, the tracking results from using a particle filter alone are subject to much jitter, which is unfavorable for practical systems. The exemplary multi-scale tracker 208 strikes a trade-off between fast-motion detection and jitter control.

The multi-scale tracker 208, therefore, may include two or more face trackers to track face movement across the display image 110 in a hierarchy of resolution versions ("layers") of each given video frame. For example, a first tracker 226, second tracker 228, third tracker 230, and "Nth" tracker 232 may be communicatively coupled for tracking a face in their corresponding resolution layers, each resolution layer stored as a version of the original image in the images buffer 220. The multi-scale tracker 208 also includes an interlayer initiator 234 to propagate a current position of the face 114 from tracker to tracker, that is, to propagate the face position for refinement by successive trackers at higher and higher resolutions.

To begin face tracking, the tracking initiator 202 initializes the multi-scale tracking by receiving a first frame of video content and finding a face 114 within the frame. The global face detector 204 of the tracking initiator 202 detects the presence of the face 114 via facial characteristics and also determines the position of the face 114 relative to the entire frame. The tracking initiator 202 then provides this initial face position to the multi-scale tracker 208. The global face detector 204 is turned on to perform its global face detection task either at the onset of a segment of face tracking, or after a discontinuity in the face tracking task (e.g., a scene change or a tracking failure). This global "search" for the face 114 within an entire video frame is accurate but time consuming—i.e., computationally expensive—so the global face detector 204 is turned on only in those circumstances just described in which it is unknown where the face is within the frame.

The appearance characteristics of the face 114 are kept in the stored face template 214. These stored facial characteristics are used by the multiple trackers in the multi-scale tracker 208 to recognize the face so that the changing position of the face 114 can be determined across video frames as the face 114 moves.

After the global face detector 204 finds the face 114 in the first video frame, at least some of the succeeding video frames are provided to the resolution pyramid generator 206. The original image buffer 218 stores the video frame as it is received, and then the image downsampler 224 derives different resolutions of the original image (e.g., by filtering) to be stored in the images buffer 220. The number of different resolutions that the image downsampler 224 derives is determined by the layer number selector 222. Fast-motion tracking ability is increased by adding more layers—that is, by using a greater number of different resolution versions and corresponding trackers in the multi-scale tracker 208.

The first tracker 226, operating at a lower (or lowest) resolution, may include or comprise a particle filter tracker to capture the highly dynamic motion of the target face 114. The "Nth" tracker 232, on the other hand, operating at a higher (or highest) resolution, may include or comprise a mean shift tracker. Once the (lowest resolution) first tracker 226 receives an initial face position from the tracking initiator 202, the first tracker 226 then processes the succeeding video frames to track a change in the face position.

The interlayer initiator 234 propagates the tentative face position from tracker to tracker, that is, from each lower resolution tracker (e.g., 226) to an immediately higher resolution tracker (e.g., 228). This propagation sends the face position that is output by each successive tracker to be input as an approximate starting position for the next tracker of the next higher resolution level (i.e., from the first tracker 226, to the second tracker 228, to the third tracker 230, and so on, in turn to the highest tracker 232).

In this manner, an optimal target position 236 of the face 114 is reached by the highest resolution tracker 232 without the highest resolution tracker 232 having to perform all of the tracking in a high resolution, that is, without having to find the face 114 by scanning the local region of the video frame exclusively in high resolution, which would be very computationally intensive. So, in the multi-scale tracker 208, a high resolution tracker only refines the face location forwarded by a lower resolution tracker, rather than tracking the face 114 in high resolution over a relatively large area (the area can be especially large when there is fast movement of the face 114 in the video scene).

Depending on resolutions selected for the different resolution layers, fast-motion of a face 114 is "slowed down" at lower resolutions since, for example, a face movement that covers a distance of 20 pixels at high resolution might only cover a distance of 4 pixels at a lower resolution. Since it is much more efficient to track relatively large movement distances at low resolution, the multi-scale tracker 208 remains dramatically efficient and reduces jitter.

Conventionally, the appearance characteristics of the face 114 may change from time to time (e.g., because of changes in lighting, facial expression, bodily position, perceived distance from the viewer, etc.), which greatly affects tracking performance. Conventionally, an online learning algorithm is employed in conventional tracking techniques to update the tracking target's template. However, the accumulated error of online updating processes often leads these learning algorithms to fail. Thus, for the exemplary face tracking engine 112, at the end of each multi-tracking cycle—for example, at the end of processing each video frame—when an optimal target position 236 is output, the face template evaluator 216 tests whether there have been changes in the facial characteristics compared with those in the stored face template 214. If the appearance of the face has changed beyond a threshold, then the regional scanner 210 rereads the appearance characteristics of the face 114. The local face detector 212 reads the appearance characteristics in a local rectangle of the video frame, centered upon the optimal target position 236 just output by the multi-scale tracker 208. In one implementation, if the facial characteristics have not changed beyond a threshold, then the regional scanner 210 is not turned on at all. Sometimes, although the local face detector 212 is fast, it may fail when fast motion exists, in which case the system reverts to the global face detector 204.

If the face template evaluator 216 finds the face 114 at the optimal target position 236, then, whether the regional scanner 210 updates facial appearance characteristics or not, the optimal target position 236 is fed to the (lowest) first tracker 226 for the next face tracking cycle, e.g., for the next video frame in the video frame sequence. If the face template evaluator 216 cannot find the face 114, then the global face detector 204 scans the entire video frame for the face 114 and the tracking initiator 202 reinitiates multi-scale tracking.

Figure 3:
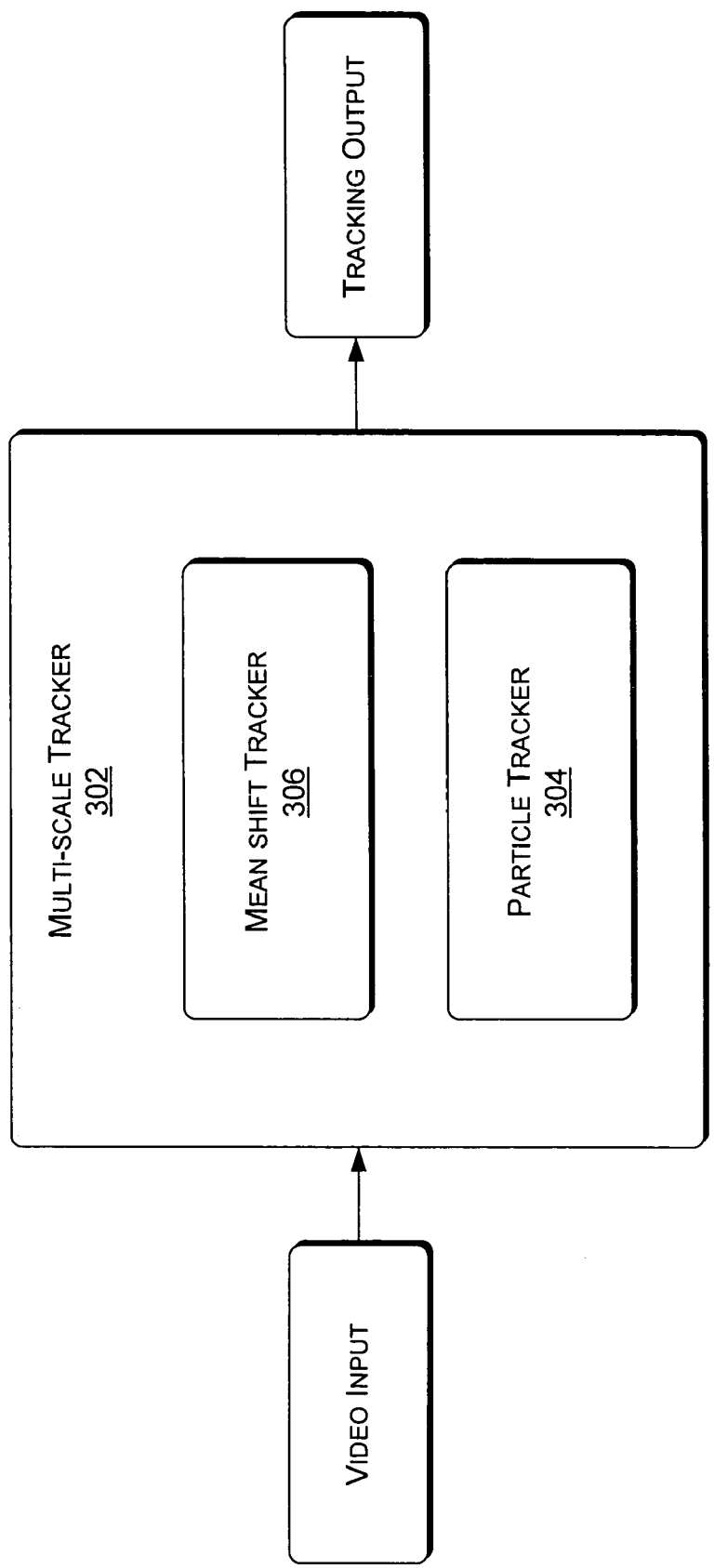
FIG. 3 is a block diagram of an exemplary multi-scale tracker.

FIG. 3 shows another exemplary multi-scale tracker 302. In this implementation, the resolution pyramid only has two layers. Accordingly, this version of the multi-scale tracker 302 has only two trackers, a low resolution particle filter tracker 304 and a high resolution mean shift tracker 306. Various known particle filter tracking procedures are available for use by the particle filter tracker 304, and various mean shift procedures can be executed by the mean shift tracker 306. For example, the mean shift tracker 306 may derive location from gradient, as in finding a root of the gradient as a function of location, or vice versa. By using the mean shift tracker 306 to find the optimal target position in the highest resolution layer of the image, jitter is decreased over using just the particle tracker 304 alone. Thus, by combining these two kinds of trackers within the resolution layer schema, the exemplary multi-scale tracker 302 can provide reasonable jitter control while maintaining fast-motion tracking performance. Moreover, the fast-motion tracking can be increased by adding more resolution layers and more trackers, as in the previously described face tracking engine 112 of FIG. 2.

Exemplary Methods

Figure 4:
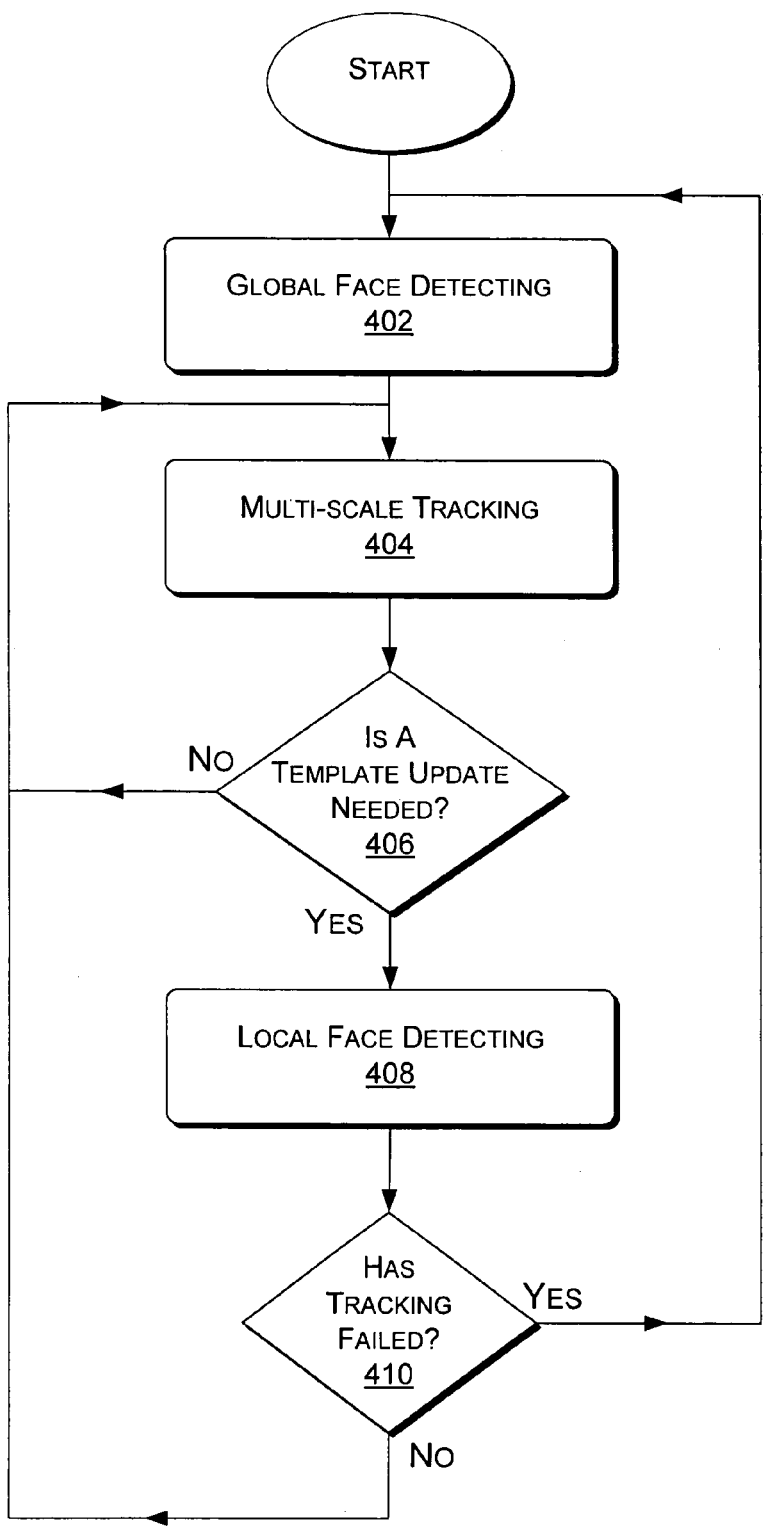
FIG. 4 is a flow diagram of an exemplary method of face tracking.

FIG. 4 shows an exemplary face tracking method 400. In the flow diagram, the operations are summarized in individual blocks. Parts of the exemplary method 400 may be performed by hardware, software, or combinations of both, for example, by components of the exemplary face tracking engine 112.

At block 402, global face detecting is performed that includes a full scan, if necessary, of the first input video frame of a video sequence in order to find a face and to find the corresponding position of the face within the video frame. The position information will be used to initialize multi-scale tracking. The global face detecting may be performed by a global face detector 204.

At block 404, multi-scale tracking is performed to track the face position. Multi-scale tracking can include the step of deriving multiple resolution versions (an "image pyramid" or "resolution pyramid") of the original image. Face tracking is then performed in a low resolution version of the original image. Then, face tracking in a higher resolution is initiated using the tracking result from the lower resolution tracking. This iterative face tracking in progressively higher and higher image resolutions can be understood as propagating the target position of the face from each lower layer of the resolution pyramid to each immediately higher layer of the pyramid.

At the highest resolution layer of the resolution pyramid, mean shift tracking is used to apply a final refinement to the target position—that is, the position of the face is determined that will be output by the multi-scale tracking method as an end result for the current video frame. Such multi-scale tracking may be performed by the multi-scale tracker 208.

At block 406, the characteristics of the object being tracked, such as characteristics of a face, are evaluated to find out if an update of the characteristics is desirable. That is, each stage of the multi-scale tracking uses a tracking template to recognize the object (face) being tracked. Since the visual characteristics of a moving face or other object are likely to change in a video sequence, the tracking template is updated periodically. Thus, evaluating can include comparing the current target's template with the stored target's template. If update of the tracking template information is not desirable, then the method 400 returns to multi-scale tracking at block 404.

At block 408, if similarity between the current visual characteristics and a previously stored set of visual characteristics, e.g., of the face, falls below a threshold at block 406, then local face detecting is activated here at block 408 to renew the tracking template with the current visual characteristics of the face being tracked. Local face detecting performs a scan only in the immediate neighborhood of the current tracking position obtained from the last tracker to perform. This saves the computational cost of having to rescan the entire video image using global face detecting at block 402. The local face detecting can be performed by local face detector 212.

At block 410, the process evaluates whether tracking has failed. If the local face detecting at block 408 finds the face, then the current visual characteristics of the face may be stored in the current tracking template and these current visual characteristics may also be sent to the next (or currently operative) tracker that is performing part of the multi-scale tracking, i.e., at block 404.

If local face detecting in block 408 cannot detect the face or other visual object at the current position determined by the multi-scale tracking, then tracking has failed and the method branches to global face detecting at block 402 to find the face—within the entire video frame, if necessary.

CONCLUSION

The subject matter described above can be implemented in hardware, software, firmware, etc., or combination thereof. In certain implementations, the subject matter may be described in the general context of computer-executable instructions, such as program modules, being executed by a computing device or communications device. Generally, program modules include routines, programs, objects, components, data structures, etc. that perform particular tasks or implement particular abstract data types. The subject matter can also be practiced in distributed communications environments where tasks are performed over wireless communication by remote processing devices that are linked through a communications network. In a wireless network, program modules may be located in both local and remote communications device storage media including memory storage devices.

The foregoing discussion describes exemplary robust online face tracking. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method executable on a computing device, the method comprising:
    deriving by a multi-scale tracker executable on the computing device, multiple resolutions of video frames of a video sequence, wherein the video sequence includes a moving visual object whose relative position in the video frames of the video sequence changes;
    tracking by a lower resolution tracker in the multi-scale tracker, the relative position and a movement of the visual object in a lower resolution of the multiple resolutions;
    propagating by an interlayer initiator executable on the computing device, the relative position and the movement of the visual object from the lower resolution tracker to an immediately higher resolution tracker, wherein an output of the tracking in the lower resolution tracker is used as input for the immediately higher resolution tracker;
    refining by a highest resolution tracker executable on the computing device, by finding an optimal target position for the visual object;
    providing the optimal target position of the visual object as the output for a current video frame based on comparing changes in the visual object to a stored template; and
    if the changes in the visual object reach or exceed a threshold amount of changes:
        rereading with a regional scanner the changes in the visual object, and
        reading with a local face detector the changes in the visual object in an area of a video frame that is associated with the optimal target position.

2. The method as recited in claim 1, wherein for each video frame:
    the tracking by the lower resolution tracker in the multi-scale tracker, in the lower resolution includes obtaining a current position of the visual object; and
    the tracking by the immediately higher resolution tracker in the multi-scale tracker, in an immediately higher resolution includes beginning at approximately the current position obtained from the lower resolution tracking.

3. The method as recited in claim 1, further comprising:
receiving by the computing device, a first video frame of the video sequence;
finding the visual object in the first video frame;
receiving subsequent video frames of the video sequence; and
deriving the multiple resolutions of each subsequent video frame.

4. The method as recited in claim 1, wherein tracking in the lower resolution includes using a particle filter and tracking in the immediately higher resolution includes using a mean shift tracker.

5. The method as recited in claim 1, wherein the visual object is a representation of a face.

6. The method as recited in claim 1, wherein if the visual object has moved such that the visual object cannot be found for the tracking in the lower resolution, then scanning an entire video frame for the visual object.

7. The method as recited in claim 1, further comprising increasing a number of the multiple resolutions to increase a fast-motion tracking ability.

8. The method as recited in claim 7, further comprising, in a hierarchy of the multiple resolutions, propagating the output of tracking each lower layer of resolution to initiate the tracking of each immediately higher layer of resolution.

9. A face tracking system comprising:
a face tracking engine executed in hardware;
a video sequence input configured to receive a sequence of video frames;
an images buffer, embedded in hardware, configured to contain multiple versions of each video frame, wherein each version possesses a different resolution;
a multi-scale tracker configured to perform fast-motion tracking to track movements of a visual object in the video sequence at different resolutions while reducing jitter in the video sequence;
the multi-scale tracker further configured to use multiple tracking techniques by tracking a movement of the visual object at a lower resolution using a particle filter and tracking the movement of the visual object at a highest resolution using a mean shift tracker;
the mean shift tracker configured to find a root of a gradient as a function of a location;
the mean shift tracker further configured to obtain an optimal target position in the highest resolution while decreasing jitter; and
the mean shift tracker further configured to provide the optimal target position of the visual object as the output for a current video frame.

10. The system as recited in claim 9, further comprising a layer number selector configured to select a higher number of the multiple versions in the images buffer to increase the fast-motion tracking to track movements of the visual object.

11. The system as recited in claim 10, further comprising multiple trackers in the multi-scale tracker, wherein each of the multiple versions in the images buffer has a corresponding tracker.

12. The system as recited in claim 11, further comprising an interlayer initiator, to propagate an output of a lower resolution tracker to an immediately higher resolution tracker in order to initiate the tracking of the immediately higher resolution tracker.

13. The system as recited in claim 9, wherein the multi-scale tracker is capable of tracking a visual representation of a face using multiple video frame resolutions.

14. The system as recited in claim 13, further comprising a tracking initiator to scan a video frame until the face is detected and to store a template of characteristics of the face.

15. The system as recited in claim 14, further comprising a face template evaluator, wherein in response to the multi-scale tracker detecting a current position of the face using the highest resolution, the face template evaluator compares current characteristics of the face with stored characteristics of the face in the stored template.

16. The system as recited in claim 15, wherein if the current characteristics have changed beyond a threshold from the characteristics in the template, then refreshing the template by storing the current characteristics of the face in the template.

17. A method executable on a computing device, the method facilitating reliable fast-motion tracking of sudden, quick position changes of a moving human face in video frames of a video sequence and facilitating concurrent reduction of jitter of a human face, the method comprising:
deriving by a multi-scale tracker executable on the computing device, multiple resolutions of video frames of a video sequence that includes the human face, the human face having a relative position in each video frame and the relative position in each video frame changes transitionally within the video sequence;
tracking by a low resolution tracker executable on the computing device, a translational movement of the human face in a lower resolution of the multiple resolutions, wherein the translational movement of the human face comprises a sudden, quick translational position change;
propagating by an interlayer initiator executable on the computing device, the translational movement of the human face from the low resolution tracker to an immediate higher resolution tracker, wherein an output of the tracking in the low resolution tracker is used as input for the immediate higher resolution tracker;
refining by a mean shift tracker executable on the computing device, an optimal target position for the human face obtained in a highest resolution of the multiple resolutions; and
providing by the mean shift tracker, a current position based on using the optimal target position of the human face as the output for a current video frame based on comparing changes in the human face to a stored template; and
if the changes in the human face reach or exceed a threshold amount of changes:
rereading with a regional scanner the changes in the human face, and
reading with a local face detector the changes in the human face in an area of a video frame that is associated with the optimal target position.

* * * * *